United States Patent [19]
Tsuchiya

[11] 3,972,274
[45] Aug. 3, 1976

[54] METHOD AND APPARATUS FOR CONTINUOUSLY TREATING PARTICULATE MATERIAL

[75] Inventor: Takuzo Tsuchiya, Minneapolis, Minn.

[73] Assignee: General Mills, Inc., Minneapolis, Minn.

[22] Filed: Mar. 21, 1974

[21] Appl. No.: 453,459

Related U.S. Application Data

[62] Division of Ser. No. 222,751, Feb. 2, 1972, Pat. No. 3,833,748.

[52] U.S. Cl. ................................. 99/323.4
[51] Int. Cl.² ........................... A23L 1/18
[58] Field of Search ............ 99/323.4, 467; 302/24, 302/25

[56] References Cited
UNITED STATES PATENTS

| | | |
|---|---|---|
| 1,639,909 | 8/1927 | Suzuki .............................. 99/323.4 |
| 1,824,221 | 9/1931 | Mason .......................... 99/323.4 X |
| 1,924,827 | 8/1933 | Anderson...................... 99/323.4 X |
| 2,622,985 | 12/1952 | Haughey et al............... 99/323.4 X |
| 3,128,690 | 4/1964 | Maehl................................. 99/323.4 |
| 3,333,774 | 8/1967 | Demaison ........................... 302/24 |
| 3,707,380 | 12/1972 | Dunning et al. ............... 99/516 UX |

*Primary Examiner*—Leonard D. Christian
*Assistant Examiner*—Donald B. Massenberg
*Attorney, Agent, or Firm*—Gene O. Enockson; Norman P. Friederichs

[57] ABSTRACT

A method and apparatus is disclosed for continuously treating an active particulate material, typically, starch materials, protein materials and oil containing materials, under heat and pressure.

4 Claims, 6 Drawing Figures

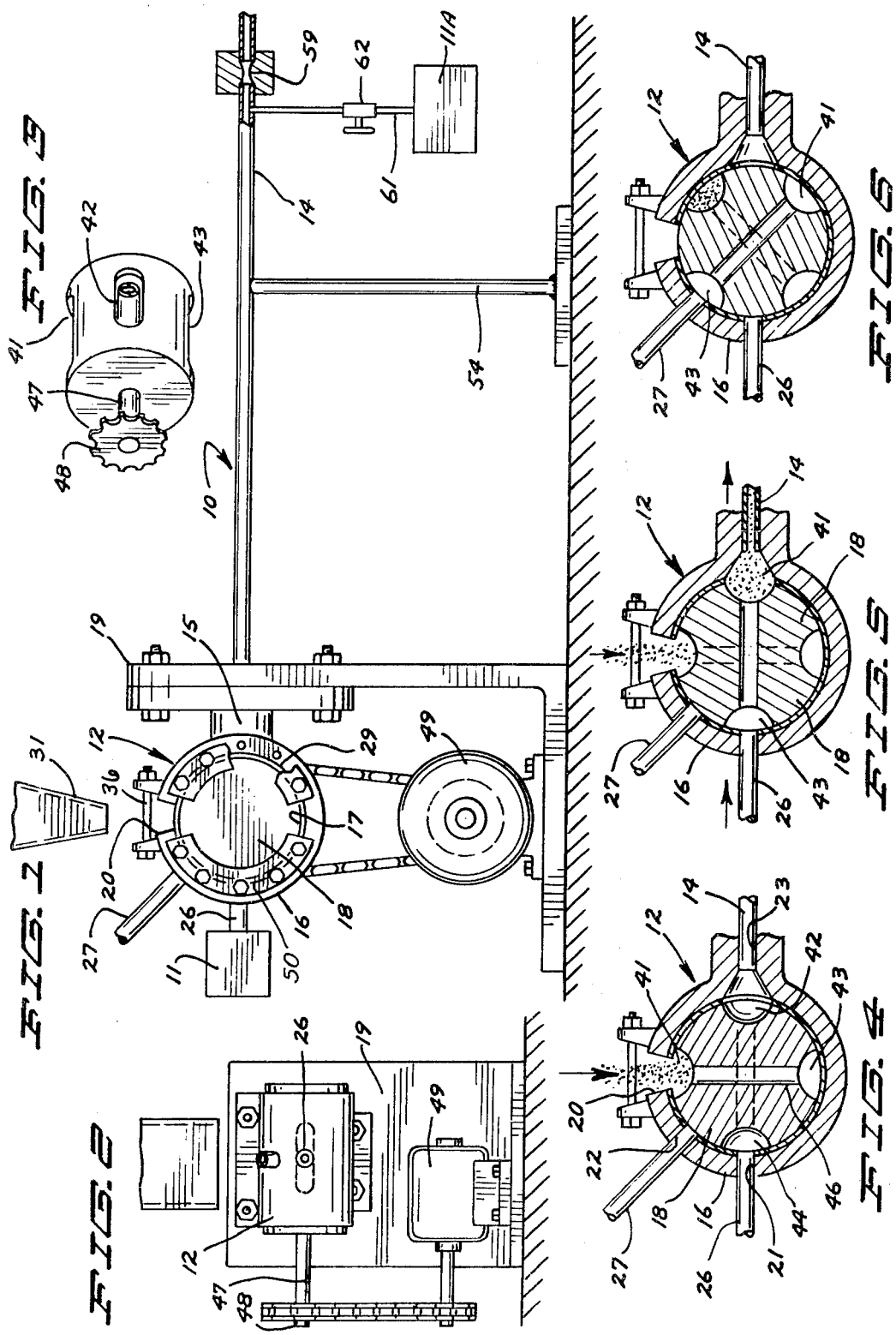

METHOD AND APPARATUS FOR CONTINUOUSLY TREATING PARTICULATE MATERIAL

This is a division of application Ser. No. 222,751, filed Feb. 2, 1972, now U.S. Pat. No. 3,833,748 (Sept. 3,1974).

The present invention relates to processing of food materials and more particularly to processing of such materials under heat and pressure.

The present invention provides a method and apparatus suitable for treating particulate heat and pressure reactive material, such as rice. It was recently discovered that heat and pressure reactive material may be treated by propelling masses of the material in a confined path through an area of elevated temperature and pressure. The particulate material may be entrained in a gas flow with the gas being at an elevated temperature and pressure. The present invention provides a method and apparatus for control of the residence time of the reactive material in the gas flow.

The materials that may be treated according to the present invention are many and varied and include any material that is reactive in the presence of the heat and pressure of the present invention. The reaction that takes place may be either a chemical or a physical reaction. Processing of the present invention may include one or more of the following: gelatinization, texturization, puffing, homogenizing and agglomerating. One illustrative class of materials processed according to the present invention includes the cereals and mixtures of cereals with other materials. The cereals typically include wheat, corn, rice, tapioca and the like. The cereals may be in the form of extruded cereal pellets or may be the whole or cracked particles of the cereal grain. Other similar starchy particulate material includes typically potato particles. One reaction that takes place when such starchy materials are subjected to the heat and pressure is gelatinization.

Another class of reactive material that may be treated according to the present invention is protein material. The reaction obtained in this instance is texturization. This class typically includes the various defatted oil seed meals and flours such as soybean, peanut, cottonseed and sesame. This class further includes the protein concentrates and isolates of such defatted oil seed materials, as well as various other untextured protein materials such as gluten, yeast, sodium caseinate and the like. Texturized protein, when moist, is somewhat tough or chewy much like meat.

A further class of reactive materials that may be treated according to the present invention includes those materials that may be homogenized. This class includes the oil containing materials such as dutched cocoa. The fat is normally present in cocoa powder as fat globules. In the process of the present invention the fat globules are broken up and uniformly distributed throughout the powder particle thereby providing a dark cocoa product. The processed cocoa material dispenses more readily in water than does the untreated cocoa powder. The cocoa is also agglomerated and puffed. A sugar and flour mixture may also be homogenized. The sugar is believed to melt and become uniformly spread on the surface of the flour.

Apparatus of the present invention is shown in the drawings as follows:

FIG. 1 shows a side view of the apparatus with portions broken away.

FIG. 2 shows an end view of the apparatus.

FIG. 3 shows a portion of a valve of the apparatus.

FIGS. 4–6 show cross sectional views of the valve in various positions of operation.

The apparatus 10 (FIG. 1) may include a rotary valve 12 and a pipe or tube 14 which serves as processing chamber. The apparatus 10 is connected to a high pressure fluid source 11 such as a steam boiler which should be capable of providing pressure, for example, of at least 15 p.s.i.g. to the rotary valve 12.

The rotary valve 12 may include a valve housing 16 with an opening or chamber 17 for reception of the rotary valve member or plug 18. The valve housing 16 has a base 15 for support of the valve 12 on bracket 19. The valve housing 16 has an upper opening 20 which serves as an inlet for material to be treated. The housing 16 (FIG. 4) further includes openings 21, 22 and 23 for reception of pipes 26, 27 and 14, respectively. The pipes, for example, may be threadedly engaged in said openings. The pipe 26 is connected to the steam source 11 and feeds the pressurized steam to the valve 12. Pipe 27 is an exhaust pipe which depressurizes any residual steam pressure in valve 12 prior to feeding of material to the valve 12 through opening 20. Pipe 14 is the tube through which the reactive material leaves valve 12 and in which the reactive material is treated. A hopper 31 (FIG. 1) may be provided for feeding material to opening 20 in valve 12. The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 29 tightly against the rotary valve member 18 thereby providing a steam seal between bearing 29 and the rotary valve member 18. The bearing 29 may be constructed from a brass cylinder.

The rotary valve member 18 (FIGS. 2–6) may be of steel and may be constructed from a solid cylinder or alternatively it may be formed by casting. The member 18 is provided with any desired number of material conveying pockets such as 41, 42, 43 and 44. The member 18 will normally have an even number of such pockets, typically four, six or eight. A passageway 46 is provided between each pair of pockets such as pockets 41 and 43, for purposes hereinafter described. The rotary valve member 18 has a shaft 47 and a sprocket 48 for driven engagement with suitable power means such as motor 49 (FIG. 1). The valve member 18 may be held in position on housing 16 by restraining plates, such as plate 50 which is secured to housing 16 by screws.

The tube 14 in the embodiment shown in FIG. 1 may be secured to the rotary valve 12 and may be further supported by one or more legs such as leg 54. The tube 14 may have a restricted orifice or nozzle 59 which limits the escape of pressure from the apparatus 10 thereby providing a build up of pressure in the tube 14. The restriction should be sufficient to maintain a minimum pressure of at least about 15 p.s.i.g. in the tube 14.

The apparatus 10 includes a gas line 61 which may extend from a pressurized gas source 11A to an entry point to tube 14 slightly upstream of the nozzle 59. The gas source 11A may be any source of high pressure gas. For example, gas source 11A may be high pressure air at room temperature. Alternatively, gas source 11A may be high pressure steam. The gas source may be the same source as the high pressure fluid source 11. The gas pipe 61 includes a valve 62 for adjusting the amount of gas flowing through pipe 61. The gas flows into tube 14 from pipe 61 and provides a back pressure to material traveling through tube 14. The back pressure reduces the flow rate of material through tube 14 thus increasing the residence time of the reactive material in the apparatus 10. The amount of gas flowing through pipe 61 and in turn the length of residence time of the reactive material in tube 14 is controlled by the valve 62.

The reactive material may be added to the apparatus 10 such as through the hopper 31. If desired, suitable provision may be made for metering or controlling the amount of feed material passing through the hopper 31. The feed material leaving hopper 31 falls through opening 20 in the housing 16 of valve 12 thus being deposited, for example, in pocket 41 as shown in FIG. 4. The valve member 18 rotates in a clockwise direction such that pocket 41 aligns with tube 14 and pocket 43 aligns with steam pipe 26 in FIG. 5. At that point, the residual pressure in tube 14 from pipe 61 and the pressure from steam pipe 26 act on the reactive material. The pressure exerted by the fluid flow from pipe 61 may be at least about 15 p.s.i.g. or more and is generally at least 55 p.s.i.g., preferably at least 80 to 110 p.s.i.g. The pressure exerted through pipe 26 by the steam source 11 should be enough greater than the pressure exerted from the pipe 61 that the reactive material is forced through tube 14. The temperature of the steam fed to the valve 12 will usually be at least 250°F. and commonly 400° or 500°F. It is believed that the treatment takes place as the reactive material travels through tube 14. Steam pressure continues to pass through valve 12 for an instant following expulsion of the reactive material from valve 12. This raises the pressure in tube 14. Of course, some pressure is lost through the tube 14 and nozzle 59 for an instant following expulsion of the reactive material from nozzle 59. However, the proper pressure is maintained in tube 14 because of the reduced orifice in nozzle 59. It has been found that the protein material, for example, fails to texturize appreciably if the pressure in tube 14 is reduced to below 15 p.s.i.g.

The residence time of the reactive material in tube 14 is controlled by the amount of gas fed to tube 14 through by-pass gas pipe 61. In other words the nozzle 59 is satisfied by a certain fluid flow, and the more of that fluid flow satisfied by fluid from pipe 61, the less will be the linear speed of fluid and material through tube 14. A lower linear speed provides a greater residence time. Thus the linear speed of fluid and material may be reduced by opening valve 62 and such linear speed may be increased by closing valve 62.

The valve member 18 continues to rotate and pocket 43 aligns with exhaust pipe 27 and residual pressure in pockets 41, 43 and passageway 46 is relieved. Pocket 43 then reaches the feed port and is loaded with material to be reacted. The operational process then continues as described with respect to reaction in the pocket 41. Reaction takes place in pockets 42 and 44 substantially as described with respect to pockets 41 and 43. The valve member 18 may be rotated at any desired speed depending upon such things as the size of the pockets, the number of pockets and the feed rate of reactive material.

The following example is illustrative of the present invention and is not intended for purposes of limitation.

EXAMPLE

Long-grained rice was treated according to the present invention for the purpose of gelatinizing and puffing the rice. The apparatus used was as shown in FIG. 1. The tube 14 was 18 feet in length and 1½ inches in diameter. The nozzle 59 had an orifice of seven sixteenths inch. Rice having a moisture content of 13% by weight was fed to the apparatus 10 at a rate of 5 pounds per minute. The steam from source 11 had a pressure of 140 p.s.i.g. and a temperature of 550°F. The apparatus was placed in operation with valve 62 in a closed position. The flow rate of steam through tube 14 was 1100 pounds per hour. The residence time of the rice in the tube 14 was too short to permit enough heat to be transferred to the rice to reach the puffing threshold. The valve 62 was slowly opened until the pressure applied to tube 14 from pipe 61 was sufficient to provide an appropriate residence for puffing of the rice. The resulting rice was puffed.

The embodiments of the invention in which an exclusive property or privilege is claimed are defined as follows:

1. Apparatus for processing heat and pressure reactive particulate material comprising:
   horizontal elongated cylinder means having a material receiving end and a material outlet end defining a restrictive orifice;
   feeding means adjacent said material receiving end for feeding said reactive particulate material to the receiving end of said cylinder means;
   said feeding means including means for supplying a stream of hot, pressurized gas flowing through said horizontal cylinder means, said stream being capable of carrying said reactive particulate material through said horizontal cylinder means and discharging said reactive particulate material through said orifice; and
   means for supplying a second stream of gas entering the cylinder means adjacent the upstream side of said restrictive orifice, means for adjustably controlling the magnitude of said second stream, said second stream being capable of supplying a portion of the amount of gas passing through said restrictive orifice thereby limiting the amount of said first stream and reactive particulate material passing through said restrictive orifice whereby the flow rate of said first stream is reduced thereby increasing the residence time of the reactive particulate material in the cylinder means.

2. The apparatus of claim 1 wherein the feeding means is a rotary valve.

3. The apparatus of claim 1 wherein the stream of hot, pressurized gas includes steam.

4. The apparatus of claim 1 wherein the means for adjustably controlling the magnitude of said second stream comprises a valve.

* * * * *